ANODIZATION OF A COPPER-NICKEL-MANGANESE ALLOY
Original Filed May 28, 1964
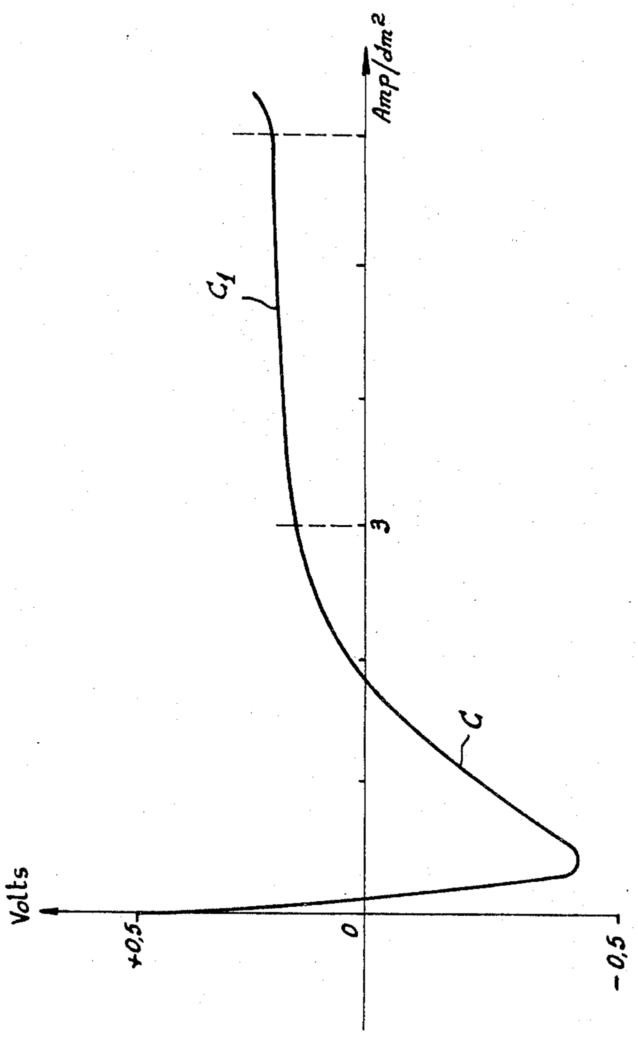
DAVID BONO
Inventor.
By Karl G. Ross
Agent

United States Patent Office 3,389,061

Patented June 18, 1968

3,389,061

ANODIZATION OF A COPPER-NICKEL-MANGANESE ALLOY

David Bono, Maisons-Alfort, Val-de-Marne, France, assignor to Association des Ouvriers en Instruments de Precision, Paris, France, a company of France Continuation of application Ser. No. 370,926, May 28, 1964. This application Sept. 5, 1967, Ser. No. 665,646
Claims priority, application France, June 4, 1963, 936,933
6 Claims. (Cl. 204—32)

ABSTRACT OF THE DISCLOSURE

Process for the anodic surface oxidation of a copper-nickel-manganese alloy layer suitable for use as a printed circuit to render the anodically oxidized surface adherent to an insulating support, in which the anodic oxidation is carried out at a current density of 3 to 6 amperes per square decimeter of the surface, the electrolyte contains 30 to 60 grams of lithium hydroxide and is an aqueous alkaline electrolyte, and the anodic oxidation is carried out at an electrolyte temperature between 75° and 85° C., preferably for a period of substantially 20 to 75 minutes and against a cadmium cathode. The flat surface of the layer, which preferably consists of manganin alloy containing 86% copper, 12% manganese and 2% nickel, is reciprocated parallel to the surface during anodization and is preferably sandblasted prior to anodization.

This application is a continuation of my copending application Ser. No. 370,926, filed May 28, 1964, now abandoned.

This invention relates to the surface treatment of articles formed of copper and its alloys. It is of particular value in the production of surface-treated films or sheets of such metals to be used in the manufacture of printed circuits and the invention includes printed circuits produced with the aid of such surface treated films and sheets.

A conventional printed circuit is in the form of a flat insulating support to which an appropriately etched thin metal film adheres. This metal is usually copper but copper is unsuitable for the manufacture of resistors, not only because of its high conductivity but also because of the variation of its conductivity with temperature. Copper alloys are known, however, which have a relatively high and stable resistivity. Among such alloys are copper-nickel-manganese alloys, more particularly the alloy containing 86% of Cu, 12% of Mn and 2% of Ni, this alloy being known commercially as "Manganin."

Since the adhesion of bare metal to ordinary adhesives is very low, a thin copper film which is required to be attached to a support for the production of a printed circuit must be subjected to a preliminary surface treatment. Such a treatment usually takes the form of oxidation of the copper surface, preferably anodic oxidation in an alkali bath.

This process is, however, not universally suitable. Thus it cannot be successfully applied to copper alloys which contain manganese and nickel, because under those conditions these alloys tend to form peroxides at the metal surface, such peroxides failing to promote the necessary adhesion characteristics. Moreover the resulting manganese oxide ($MnO_2$) is usually soluble in the treatment bath.

It is an object of the present invention to provide a surface-treatment process for copper and its alloys—and more particularly alloys which contain copper, manganese and nickel—such that these alloys may adhere more readily to the insulating supports used in the production of printed circuits, either directly (when such supports are in the plastic state) or indirectly (through the agency of an appropriate adhesive).

According to the present invention there is provided a process for the surface treatment of a copper or copper-alloy film or sheet which comprises subjecting the said metal to anodic oxidation in an aqueous solution containing between 30 and 60 g. of lithium hydroxide per liter in an electrolysis apparatus containing a metal cathode inert to attack by alkali in an alkaline electrolyte medium. Preferably the concentration of the lithium hydroxide is 40 to 45 g./liter.

In accordance with a further feature of the invention, the treatment is carried out at temperatures between 70 and 85° C. The films are preferably agitated in parallel relationship to their surface during the treatment, for example at the rate of one movement per second, with an amplitude of a few centimeters. The effect of this agitation is to prevent the film surface from being stained with trails of the gases which are evolved in abundance, so that a homogeneous satin finish is obtained. The treatment time is advantageously between 20 and 75 minutes. The current density is preferably between 3 and 5 amperes per square decimeter, the interelectrode (i.e. anode-cathode) voltage being preferably in the region of 2.6 volts in the case of a cadmium cathode.

The foregoing preferred conditions appear to give controlled oxidation of all the metals of the copper alloy, the oxidation state being such that the resultant products adhere firmly to the surface of the alloy.

The framed film is then rinsed with clean water and invention. In Example I reference is made to the accompanying diagram which shows the variation in the anode potential (ordinate) with the current density (abscissa) for anodic oxidation treatment under the conditions of that example.

Example I

A manganin film 0.04 millimeter thick is degreased with cold trichloroethylene, and then clamped to a copper frame. This film is pickled by quenching the assembly in a pure nitric-acid bath for three seconds maximum. The pickling time may, if necessary, be extended if the film is thicker.

The framed film is then rinsed with clean water and immersed for a comparable period in a brightener bath (a mixture of concentrated sulphuric and nitric acids, to which sodium chloride has been added), and then re-rinsed.

The film is then electrolytically degreased by bing disposed as the cathode of a soda and sodium-cyanide bath for about 20 seconds, and is then re-rinsed.

All these treatments are conventional in the preparation of a copper-alloy component for an electrolytic treatment.

The framed film is then disposed as the anode in a bath containing 40 to 45 g. of lithium hydroxide per liter.

The cathodes are of cadmium (they may alternatively be of nickel or iron) and are enclosed in cloth bags.

The framed film is agitated at 24 strokes per minute in its plane (48 reciprocations) at an amplitude of 25 millimeters. The temperature during the treatment is 80° C., the temperature is kept at this value to within ±2° C. by a thermostat.

The anodic oxidation time is 40 minutes with a current density of 3.1 amperes/$dm^2$.

The bath is advantageously continuously filtered although it may prove satisfactory without filtration.

After oxidation the film is rinsed with tap water and distilled water and then dried in dry air. It has a fine satin appearance.

The progressive deterioration of the bath is slow. Thus, a 25-liter bath after passage of 48 ampere-hours contained 63 mg. of copper, 20 mg. of nickel and 27 mg. of manganese per liter. The sludges contained insoluble carbonates. The bath can be re-adjusted by the addition of distilled water and, if necessary, lithium hydroxide.

If a Manganin layer is placed as the anode in a bath between two cadmium cathodes and a progressively increasing voltage is applied between the electrodes in relation to a reference electrode (for example a calomel-electrode), the variations of the anode potential are as shown by curve C on the accompanying graph, which has been plotted against the current density. This graph shows a variation of the surface polarization of the film. However, this polarization is substantially stable in the region $C_1$ of the curve C from three amperes per square decimeter up to about six amperes/$dm^2$. It may be assumed that this anode-potential stability probably corresponds to the formation of insoluble products which adhere firmly to the surface of the film, and this is verified by the fact that films thus prepared can be adhered to a substrate.

In practice, the most favorable treatment conditions are a current density of 3 amperes per square dm and a voltage of 2.6 volts in the case of cadmium cathodes.

In commercial alloy films or strips the slight variations in the local concentration of the components of the alloy and differences in the cold-hardened condition due to rolling prevent precisely identical results from being obtained on different samples treated according to example I.

To obtain more homogeneous results the following method is preferable for the pre-treatment of the films.

Example II

The treatment again begins with degreasing with cold trichloroethylene, whereafter the Manganin film is clamped to a very rigid support of strong metal, for example steel, the surface of the film which is intended to be bonded to the substrate being disposed on the outside. This surface is then treated by fine wet sandblasting with silica or alumina.

The abrasive grain size used is preferably 20 microns but may be as much as 100 microns. Blasting is carried out with an air pressure of 5 to 10 kg./$cm.^2$ so that the speed of the grains may be 300 meters per second.

This gives a pickled and satin-finish alloy film which is not, however, adhesive. After rinsing and drying it is fixed to a copper frame as in Example I whereafter the film is anodically treated as in that example.

In both cases (Examples I and II), the frames which were used as supports for the films are also oxidized by the treatment and must be pickled as indicated in Example I so that they may remain conductive for re-use.

The thin alloy films treated according to the invention can be fixed to any flat insulating supports either directly by incorporation in the surface of the material of the supports or by means of an appropriate adhesive for such supports.

In particular, the bonding operation may be performed with laminated insulators having a base of paper or glass fiber and as binding agent a reactive resin such as phenol formaldehyde resin or epoxy resin. The bonding operation may advantageously be carried out with epoxy-resin-based glues (adhesives known commercially by the name "Araldite") which are capable of withstanding temperatures of 100° C.

It is of course possible to attach a copper-alloy film, more particularly a Manganin film, to each of the two surfaces of a flat support in this way. In a test designed to measure the peel resistance of the bond, i.e. the force required to peel the film away from the support by breaking the adhesive, using a strip 1" wide, the adhesion force of a copper-alloy film thus prepared was found to be at least 2–3 kg.

Although particularly appropriate to the treatment of copper-containing nickel- and manganese-alloy films, the treatment according to the invention is also suitable for pure copper or other copper-alloy films.

I claim:

1. In a process for the anodic surface oxidation of a copper-nickel-manganese alloy layer to render it adherent to a support, the improvement wherein:
   (a) the surface of said layer is anodically oxidized in an aqueous alkaline electrolyte containing substantially 30 to 60 grams of lithium hydroxide per liter of electrolyte;
   (b) the anodic oxidation of said surface of said layer in said electrolyte is carried out with said electrolyte maintained at a temperature between substantially 70° and 85° C.; and
   (c) the anodic oxidation of said surface of said layer is effected with an anodization current density of substantially 3 to 6 amperes per square decimeter of said surface.

2. The improvement defined in claim 1 wherein said surface is flat, further comprising the step of:
   (d) reciprocating said layer relatively to said electrolyte during the anodization of said surface parallel to the plane of the surface.

3. The improvement defined in claim 1 wherein said surface is anodized in said electrolyte against a cadmium cathode immersed therein.

4. The improvement defined in claim 1 wherein the anodization of said surface in said electrolyte at said current density is carried out for a period of about 20 to 75 minutes.

5. The improvement defined in claim 1 wherein said surface is sandblasted prior to anodization thereof.

6. The improvement defined in claim 1 wherein said alloy consists essentially of about 86% by weight copper, about 12% by weight manganese and about 2% by weight nickel.

References Cited

UNITED STATES PATENTS

| | | | |
|---|---|---|---|
| 2,364,993 | 12/1944 | Meyer | 148—6.14 |
| 2,828,250 | 3/1958 | Hurd | 204—28 |
| 3,215,574 | 11/1965 | Korb | 156—3 |

FOREIGN PATENTS

| | | |
|---|---|---|
| 1,294,742 | 4/1962 | France. |
| 727,899 | 11/1942 | Germany. |

OTHER REFERENCES

Field, Samuel et al., "The Chemical Coloring of Metals," Chapman and Hall, Ltd., p. 53, 1925.

Wernick, S., et al., "Surface Treatment and Finishing of Aluminum and its Alloys," Robert Draper, Ltd., p. 264, 1956.

HOWARD S. WILLIAMS, *Primary Examiner.*

JOHN H. MACK, *Examiner.*

G. KAPLAN, *Assistant Examiner.*